US010222927B2

(12) United States Patent
Smolinski et al.

(10) Patent No.: US 10,222,927 B2
(45) Date of Patent: Mar. 5, 2019

(54) SCREEN MAGNIFICATION WITH OFF-SCREEN INDICATION

(71) Applicant: Microsoft Technology Licensing, LLC, Redmond, WA (US)

(72) Inventors: Adam Smolinski, North Bend, WA (US); Henry Yao-Tsu Chen, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 322 days.

(21) Appl. No.: 14/523,836

(22) Filed: Oct. 24, 2014

(65) Prior Publication Data

US 2016/0117057 A1  Apr. 28, 2016

(51) Int. Cl.
*G06F 3/048* (2013.01)
*G06F 3/0481* (2013.01)

(52) U.S. Cl.
CPC .. *G06F 3/0481* (2013.01); *G06F 2203/04805* (2013.01); *G06F 2203/04806* (2013.01)

(58) Field of Classification Search
CPC ...... G06F 3/0481; G06F 3/0485; G06F 3/167; H04N 21/4312; G09B 21/006; G09B 21/001
USPC .......................... 715/784, 729, 865; 345/620
See application file for complete search history.

(56) References Cited

U.S. PATENT DOCUMENTS

| | | | |
|---|---|---|---|
| 5,223,828 A * | 6/1993 | McKiel, Jr. | G06F 3/04812 340/4.13 |
| 7,913,182 B2 | 3/2011 | Bear et al. | |
| 8,589,818 B1 | 11/2013 | Jones et al. | |
| 8,601,371 B2 | 12/2013 | Dirks et al. | |
| 8,635,021 B2 | 1/2014 | Heng et al. | |
| 8,650,501 B2 | 2/2014 | Arnold et al. | |
| 2002/0175933 A1* | 11/2002 | Ronkainen | G06F 17/30796 715/720 |
| 2003/0156124 A1* | 8/2003 | Good | G06F 17/27 345/620 |
| 2006/0136839 A1 | 6/2006 | Makela | |
| 2008/0238886 A1* | 10/2008 | Bengtsson | G06F 3/016 345/177 |
| 2009/0295826 A1* | 12/2009 | Good | G06F 3/0481 345/619 |
| 2010/0115459 A1 | 5/2010 | Kinnunen et al. | |

(Continued)

OTHER PUBLICATIONS

Irani, et al., "Improving Selection of Off-Screen Targets with Hopping", In Proceedings of the SIGCHI Conference on Human Factors in Computing Systems, Apr. 22, 2006, 10 pages.

(Continued)

*Primary Examiner* — Ajay M Bhatia
*Assistant Examiner* — Alex Olshannikov
(74) *Attorney, Agent, or Firm* — Arent Fox LLP (57) ABSTRACT

In one example, a magnification display system may alert a user to event notifications that are presented outside the magnification area. The magnification display system may apply a magnification area with a magnification module to a section of a viewing area presented by a display. The magnification display system may receive an event notification outside the magnification area. The magnification display system may introduce a notification indication alerting a user to the event notification.

24 Claims, 9 Drawing Sheets

(56) References Cited

U.S. PATENT DOCUMENTS

| | | |
|---|---|---|
| 2010/0146434 A1* | 6/2010 | Blinnikka ............. G06F 3/0482 715/785 |
| 2011/0161863 A1 | 6/2011 | Rainisto |
| 2011/0214063 A1* | 9/2011 | Saul ...................... G06F 3/0481 715/740 |
| 2012/0102400 A1* | 4/2012 | Worley ................. G06F 3/0488 715/702 |
| 2012/0117507 A1 | 5/2012 | Tseng et al. |
| 2014/0082559 A1* | 3/2014 | Suggs ...................... G06F 1/16 715/835 |
| 2014/0181638 A1 | 6/2014 | Abuelsaad et al. |

OTHER PUBLICATIONS

Baudisch, et al., "Halo: a Technique for Visualizing Off-Screen Locations", In Proceedings of the SIGCHI Conference on Human Factors in Computing Systems, Apr. 5, 2003, 8 pages.

* cited by examiner

SCREEN MAGNIFICATION WITH OFF-SCREEN INDICATION

BACKGROUND

A common method of providing information from a computing device to a user is via a display screen. The display screen may produce text and visuals on a screen. The computing device may be executing multiple different applications nearly simultaneously. While the computing devices may present multiple user interfaces each representing an application at the same time, the computing device may emphasize certain applications by presenting some user interfaces while others are hidden from the user. These hidden user interfaces may represent applications that are still running in the background. When one of these background applications seeks to contact the user, the background application may produce an event notification, referred to as a "toast". The computing device may display the event notification to the user, even as the user interface remains hidden.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to a magnification display system that alerts a user to event notifications that are presented outside the magnification area. The magnification display system may apply a magnification area with a magnification module to a section of a viewing area presented by a display. The magnification display system may receive an event notification outside the magnification area. The magnification display system may introduce a notification indication alerting a user to the event notification.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a magnification display system for a computing device.

A visually impaired user may rely on a magnification display system when viewing a digital interface, such as a phone, computer monitor, tablet, or other device. The magnification display system may use a magnification module to zoom a portion of the screen to a percentage selected by the user, with no consideration to events outside the viewable area. The magnification may prevent a user from being aware of an event notification, such as an error message, a modal window, or other essential communication. Instead, a user may wait for an error to occur or may search across the entire screen. If the event notification is time-delayed, the user may completely fail to spot the event notification. Additionally, a user may be unaware of the control or action causing the notification.

The magnification display system may inform the user of an event notification by introducing a notification indication to the user interface. The notification indication may be a visual notification indication inserted into the magnification area of the magnification display system. Alternately, the notification indication may use an audio notification indication, such as a tone, or a tactile notification indication, such as a vibration. Further, the magnification display system may use the notification indication to indicate a location relative to the magnification area for the event notification and an event notification type.

The magnification display system may introduce a visual notification indication, such as a gradient, to the magnification area. The magnification display system may position the visual notification indication in the notification direction of the event notification. The magnification display system may size the visual notification indication to indicate a notification distance to the event notification. The magnification display system may shape the visual notification indication differently to represent different types of event notifications. For multiple event notifications, the magnification display system may overlay multiple visual notification indications. For example, the magnification display system may insert a gradient for communication-related event notifications. The magnification display system may insert a pixelated rectangles for operating system event notifications, such as modal windows. The magnification display system may favor shapes over colors as a differentiator, due to the possibility of color-blindness in the user. The visual notification indications may be standardized across devices or customized by the user.

When an event notification occurs outside the viewable area, the magnification display system may insert a visual notification indication into the magnification area. If, for example, the event notification is located relatively far away from the magnification area, the visual notification indication may be a small, soft gradient. If, for example, the event notification is very close to the magnification area, the visual notification indication may be a larger, harder gradient. As the user navigates towards the gradient or the event notification, the magnification display system may change the size and shape to reflect a closer distance in real time, using animation, to reflect distance and direction. Once the user has the event notification in the viewable area, the visual notification indication may change from a gradient to more of a solid shape. As a further assistance, the magnification display system may provide a map inset to show the position of the event notification relative to the magnification area.

Thus, in one example, a magnification display system that alerts a user to event notifications that are presented outside the magnification area. The magnification display system may apply a magnification area with a magnification module to a section of a viewing area presented by a display. The magnification display system may receive an event notification outside the magnification area. The magnification display system may introduce a notification indication alerting a user to the event notification. The magnification display system may indicate with the notification indication a location of the event notification in the viewing area. The magnification display system may present the notification indication as at least one of a visual notification indication, an audio notification indication, or a tactile notification indication.

Figure 1:
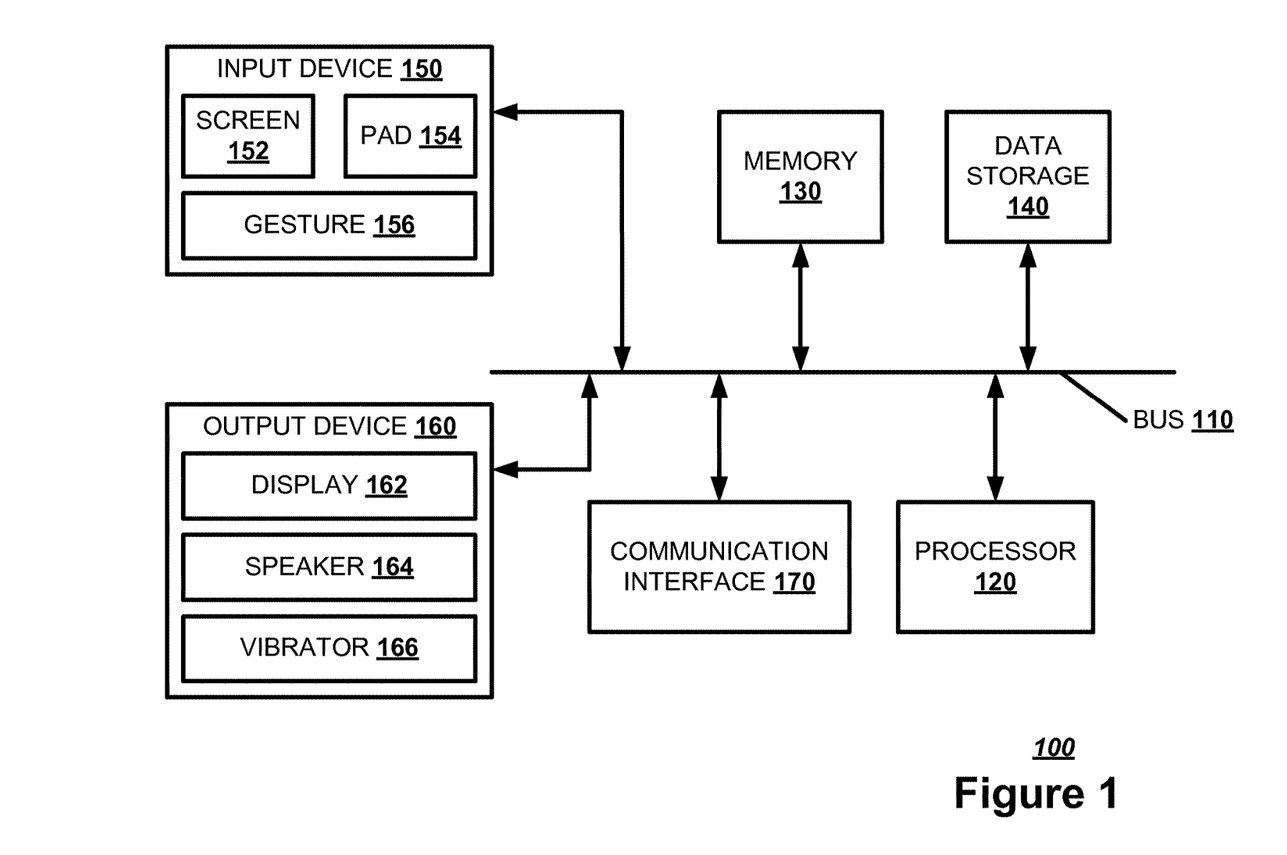
FIG. 1 illustrates, in a block diagram, one example of a computing device.

FIG. 1 illustrates a block diagram of an exemplary computing device 100 which may act as a magnification display system. The computing device 100 may combine one or more of hardware, software, firmware, and system-on-a-chip technology to implement a magnification display system. The computing device 100 may include a bus 110, a processor 120, a memory 130, a data storage 140, an input device 150, an output device 160, and a communication interface 170. The bus 110, or other component interconnection, may permit communication among the components of the computing device 100.

The processor 120 may include at least one conventional processor or microprocessor that interprets and executes a set of instructions. The memory 130 may be a random access memory (RAM) or another type of dynamic data storage that stores information and instructions for execution by the processor 120. The memory 130 may also store temporary variables or other intermediate information used during execution of instructions by the processor 120. The data storage 140 may include a conventional ROM device or another type of static data storage that stores static information and instructions for the processor 120. The data storage 140 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that when executed by one or more processors cause the one or more processors to perform the method. The data storage 140 may also be a database or a database interface.

The input device 150 may include one or more conventional mechanisms that permit a user to input information to the computing device 100, such as a keyboard, a mouse, a voice recognition device, a microphone, a headset, a touch screen 152, a touch pad 154, a gesture recognition device 156, etc. The output device 160 may include one or more conventional mechanisms that output information to the user, including a display screen 162, a printer, one or more speakers 164, a headset, a vibrator 166, or a medium, such as a memory, or a magnetic or optical disk and a corresponding disk drive. The communication interface 170 may include any transceiver-like mechanism that enables computing device 100 to communicate with other devices or networks. The communication interface 170 may include a network interface or a transceiver interface. The communication interface 170 may be a wireless, wired, or optical interface.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 170.

Figure 2:
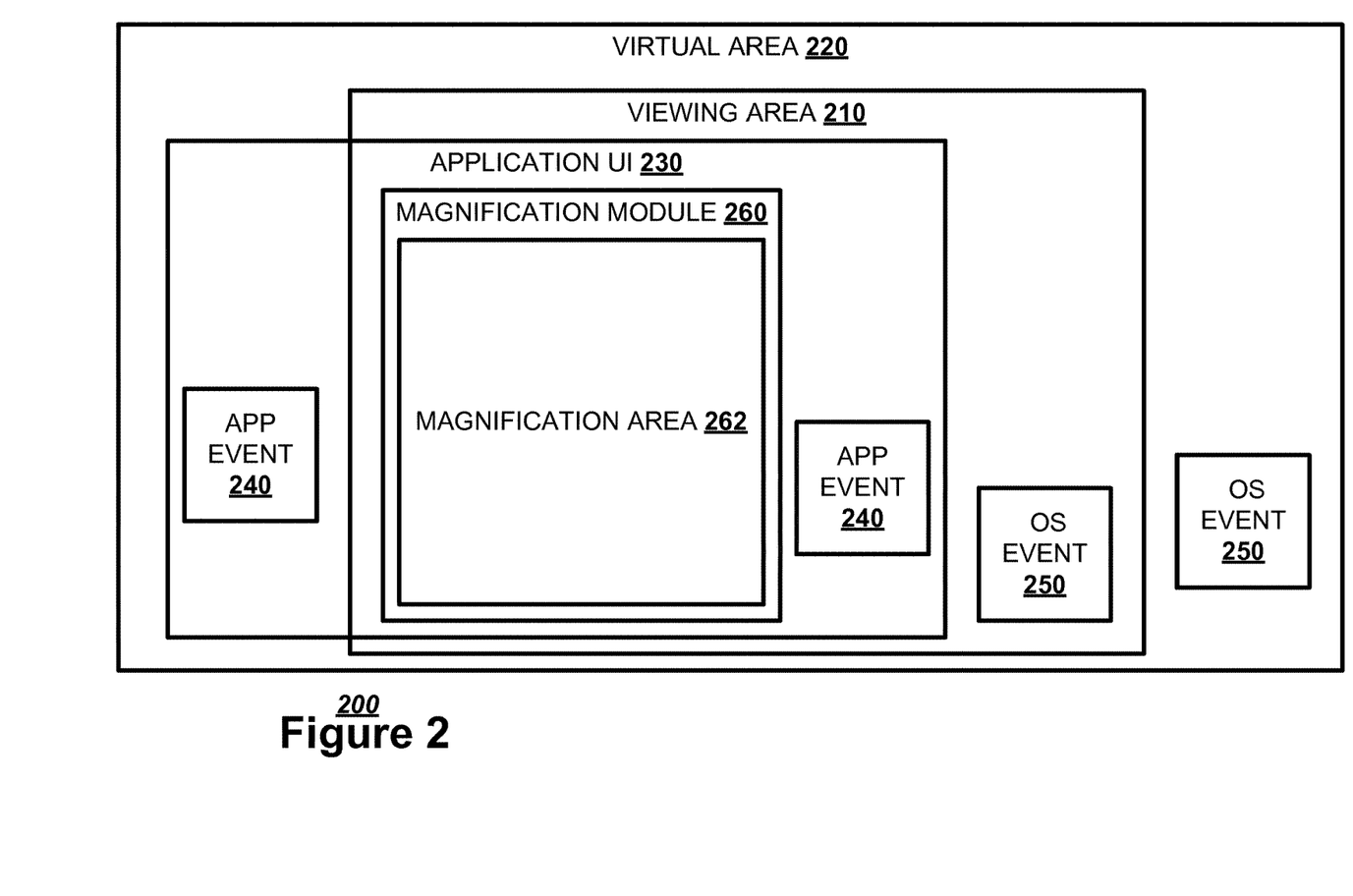
FIG. 2 illustrates, in a block diagram, one example of an augmented user display.

FIG. 2 illustrates, in a block diagram, one example of an augmented user display 200. The display screen 162 may display a viewing area 210 to a user. The viewing area 210 may present at least a portion of a virtual area 220 of an operating system user interface (UI) or an application user interface 230 to a user. The virtual area 220, including the application user interface 230, may exceed the viewing area 210, resulting in a portion of that user interface being hidden. Additionally, other application user interfaces 230 may be hidden from view when the user is not actively interacting with that application.

If the application encounters an event, representing an incident outside the normal flow of interaction between the user and the application, the application user interface may provide an application event notification 240, such as an application toast or pop-up. For example, a user may be using the application to delete a file. The application user interface 230 may present an application event notification 240 querying the user whether the user really intends to delete that file.

The operating system user interface may also present an operating system event notification 250 to the user while the user is interacting with the application user interface 230. An operating system event notification 250 notifies the user of an event encountered by the operating system. The event may be based in the operating system or in an application not currently directly interacting with the user. For example, an operating system may encounter a missing codec requested by an application running in the background, and may alert the user with an operating system event notification 250 to download the missing codec. Alternately, an electronic mail application may receive an e-mail, and alert the operating system to provide an operating system event notification 250 to the user.

Some users may be visually impaired, hampering the ability of the user to interact with the user interface. To assist the user in interacting with the user interface, a magnification display system may use a magnification module 260 to generate a magnification area 262 for a section of the viewing area 210. The magnification module 260 is an application module that may be implemented by the operating system or as a separate application or a plug-in added to an application. The magnification area 262 may expand the size of the section of the viewing area 210 so that the user may more clearly view the section. However, coding the operating system user interface or the application user interface 230 to present an event notification in the magnification area may be difficult. In those circumstances, the magnification display system may present a notification indication to the user to alert the user to the presence of an event notification outside the magnification area 262. The event notification may be within the viewing area 210 or outside the viewing area 210 but within the virtual area 220.

Figure 3A:
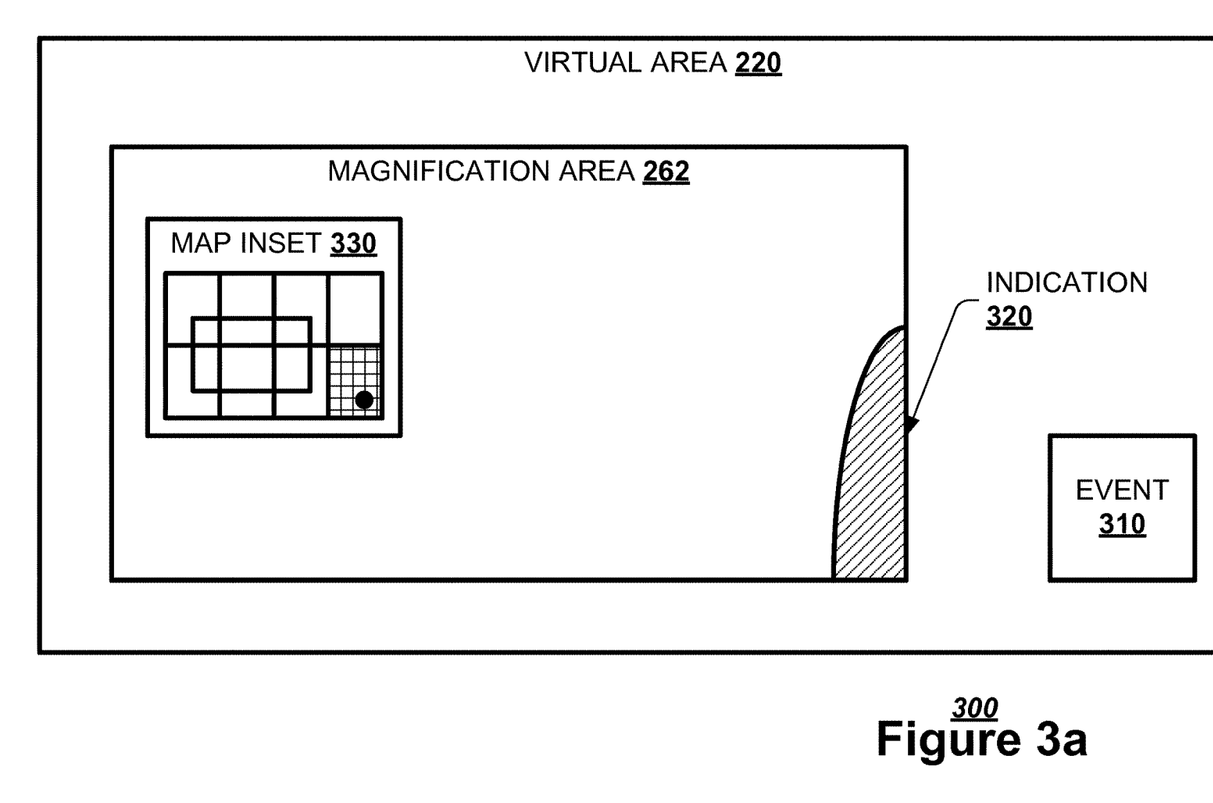
FIGS. 3a-b illustrate, in block diagrams, one example of a visual notification indication operation.

The notification indication may be a visual notification indication, an audio notification indication, or a tactile notification indication. FIG. 3a illustrates, in a block diagram, one example of an initial visual notification indication operation 300. The magnification display system may detect an event notification 310, such as an application event notification 240 or an operating system event notification 250, outside the magnification area 262. The magnification display system may introduce a visual notification indication 320 that alerts the user to the event notification 310. The magnification display system may place the visual notification indication 320 to indicate the location of the event notification 310 in the viewing area. For example, if the event notification 310 is in the viewing area 210 below and to the right of the magnification area 262, the magnification display system may place the visual notification indication 320 in the lower right corner of the magnification area 262. A tertiary characteristic of the visual notification indication 320, such as the size or intensity, may indicate the distance from the magnification area 262. A secondary characteristic of the visual notification indication 320, such as fill or shape, may indicate the interactivity of the event notification 310. For example, an event notification 310 that is strictly an alert may have a notification indication 320 with a diagonal line fill while an event notification requesting user input may have a notification indication 320 with a cross-hatch fill. The color of the notification indication 320 may be adjusted based on the colors present in the magnification area 262 to increase the contrast for the visually impaired user. The user may customize the notification indication 320. For example, if the user is color blind for specific colors, the user may customize the notification indication 320 to not use those colors.

The magnification display system may also insert a map inset 330 into the magnification area 262 to describe the location of the event notification 310. The map inset 330 may present a simplified icon to represent the event notification 310 and a simplified icon to represent the magnification area 262. The map inset 330 may be divided into sections, with the section containing the event notification 310 highlighted.

Figure 3B:
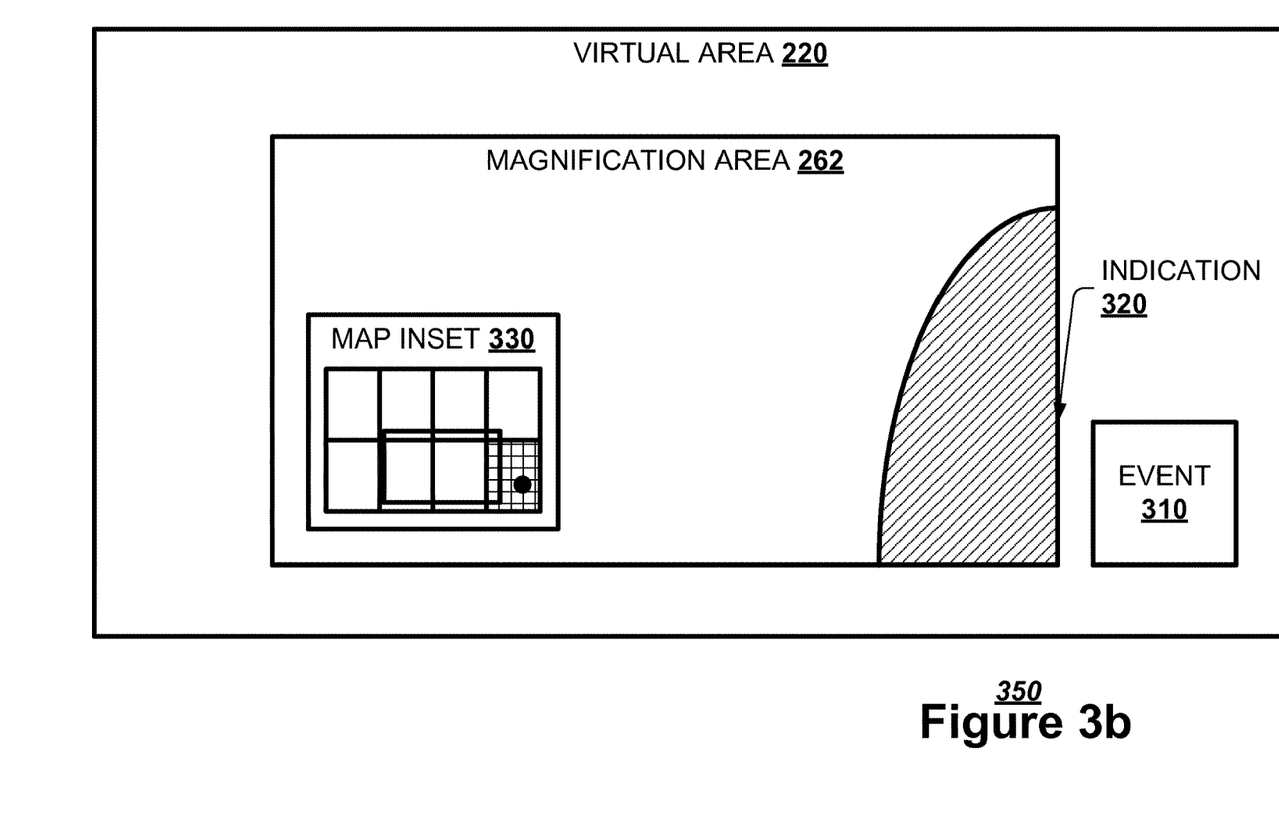

The user may move the magnification area 262 towards the event notification 310. FIG. 3b illustrates, in a block diagram, one example of a subsequent visual notification indication operation 350. As the magnification area 262 moves towards the event notification 310, the magnification display system may increase the size or intensity of the notification indication 320. For example, the notification indication 320 may cover a greater percent of the magnification area 262 or may change from a light red to a dark red. Additionally, the magnification area 262 may adjust a position of the map inset 330 within the magnification area to avoid obscuring any relevant elements in the magnification area 262.

Figure 4:
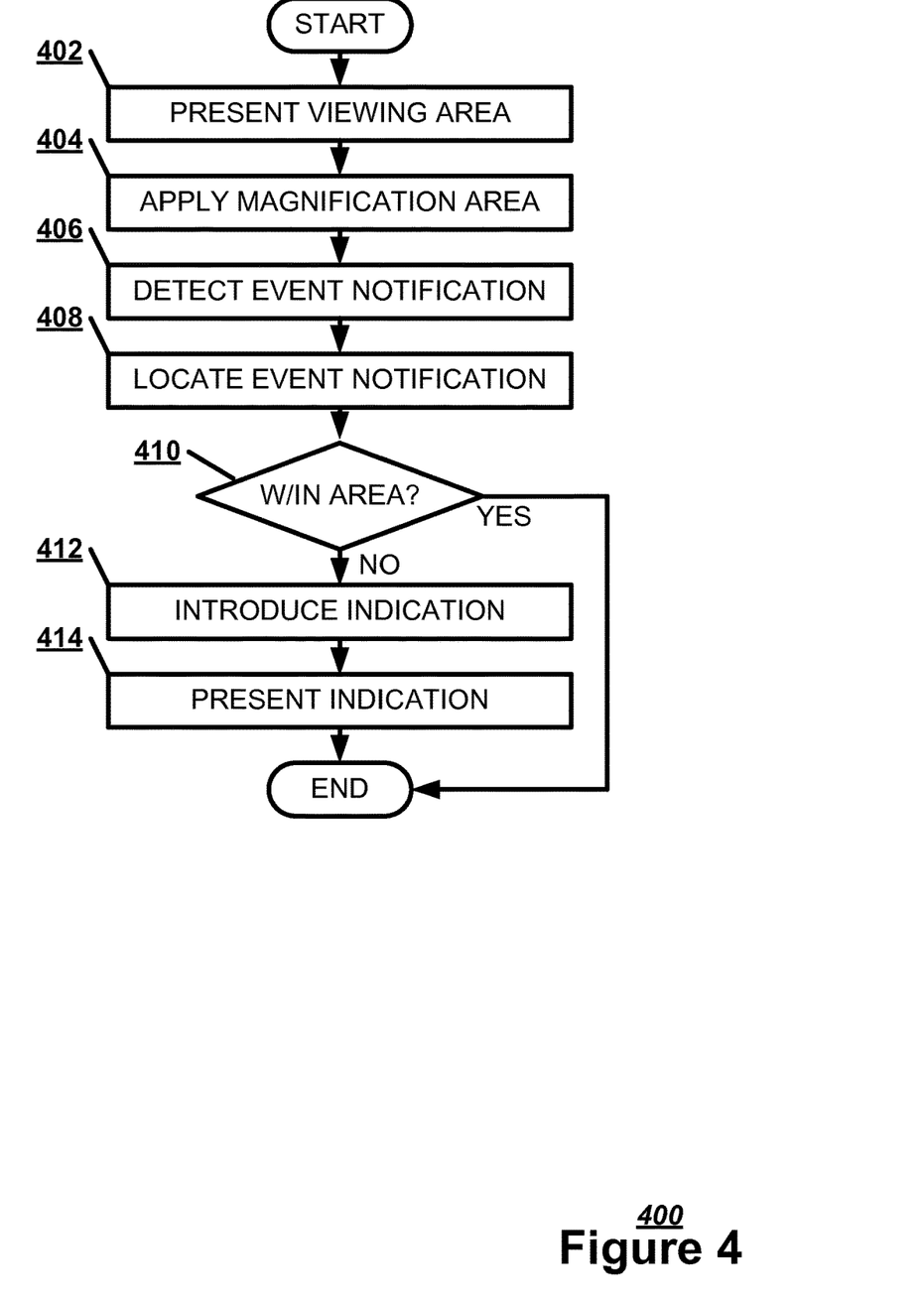
FIG. 4 illustrates, in a flowchart, one example of a method of processing an event notification.

FIG. 4 illustrates, in a flowchart, one example of a method 400 of processing an event notification. The magnification display system may present a viewing area, such as viewing area 210, as at least one of an operating system user interface or an application user interface, such as application user interface 230 (Block 402). The magnification display system may apply a magnification area, such as magnification area 262, with a magnification module, such as magnification module 260, to a section of the viewing area presented by a display screen, such as display screen 162 (Block 404). The magnification display system may detect an event notification, such as an event notification 310, displayed outside the magnification area (Block 406). The event notification 310 may be outside the viewing area, or within the viewing area but outside the magnification area. The magnification display system may locate the event notification within the viewing area (Block 408). If the event notification is not located within the magnification area (Block 410), the magnification display system may introduce a notification indication alerting a user to the event notification (Block 412). The magnification display system may present the notification indication as at least one of a visual notification indication or a non-visual notification indication, such as an audio notification indication or a tactile notification indication (Block 414).

Figure 5:
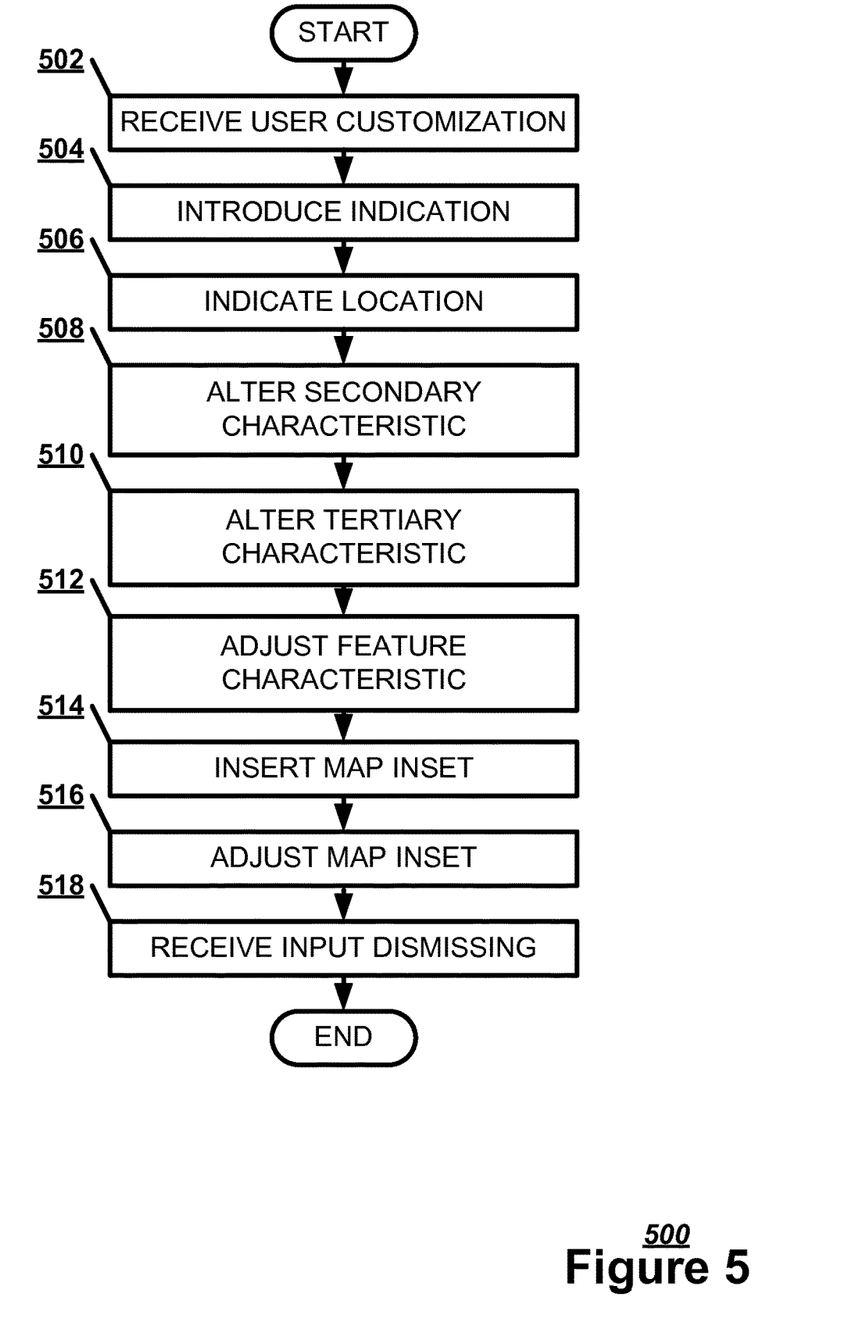
FIG. 5 illustrates, in a flowchart, one example of a method of introducing a notification indication.

FIG. 5 illustrates, in a flowchart, one example of a method 500 of introducing a notification indication. The magnification display system may receive a user customization of the notification identification (Block 502). The magnification display system may introduce a notification indication alerting a user to the event notification, such as event notifcation 310 (Block 504). The magnification display system may indicate with the notification indication a location of the event notification (Block 506). The magnification display system may alter a tertiary characteristic of the notification indication to indicate at least one of a notification direction or notification distance of the event notification in relation to the magnification area (Block 508). A tertiary characteristic is a characteristic that has minimal effect on the presentation of the notification indication. The magnification display system may alter a secondary characteristic of the notification indication to indicate an interaction type for the notification event (Block 510). A secondary characteristic is a characteristic that has moderate effect on the presentation of the notification indication. The magnification display system may adjust a feature characteristic of the notification indication to contrast with the indication context (Block 512). A feature characteristic is a characteristic that has a drastic effect on the presentation of the notification indication. The magnification display system may insert a map inset describing the location of the event notification into the magnification area (Block 514). The magnification display system may adjust a position of the map inset describing a location of the notification event to avoid obscuring a relevant element in the magnification area (Block 516). The magnification display system may receive a user input dismissing the event notification (Block 518).

Figure 6:
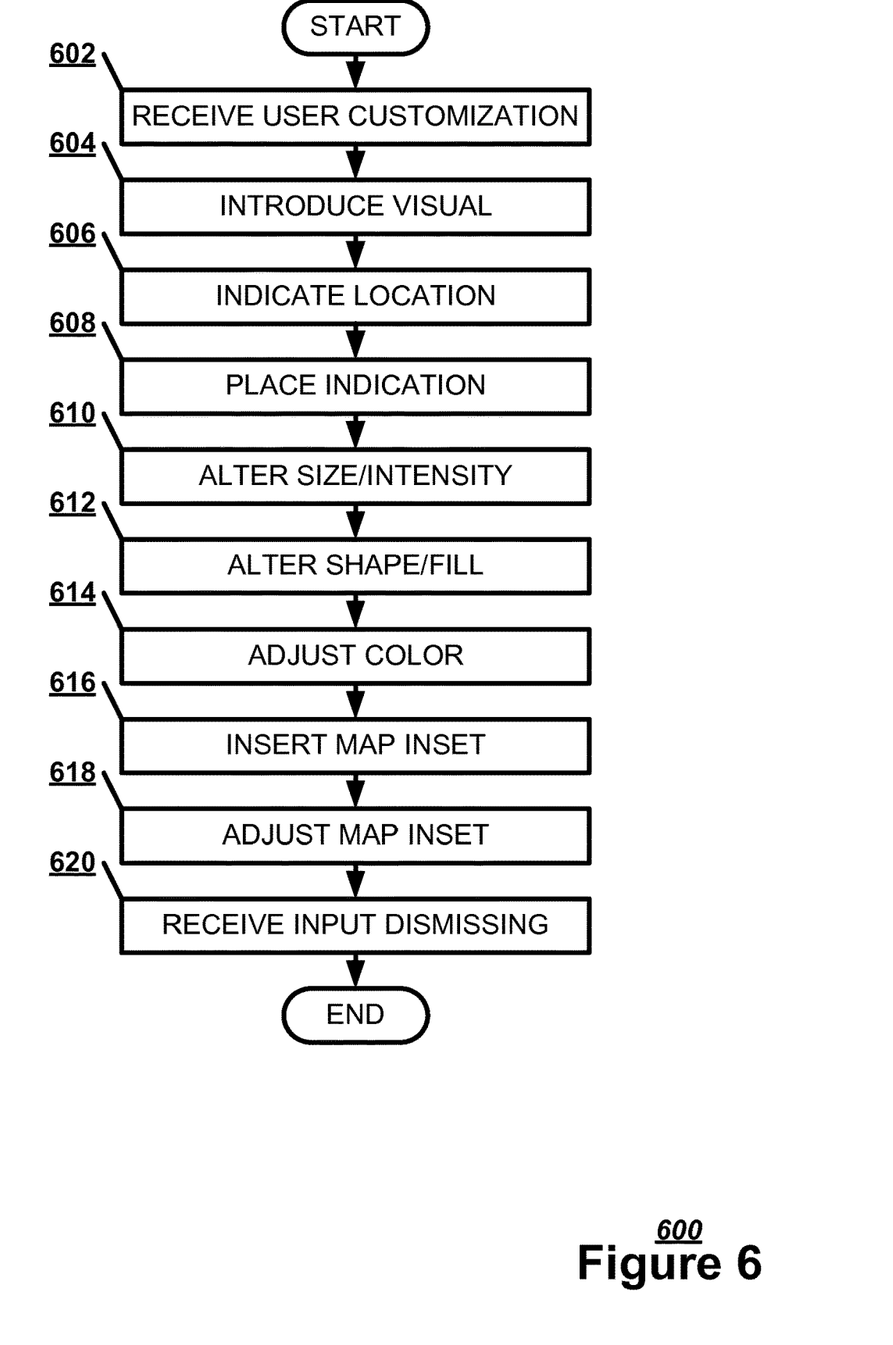
FIG. 6 illustrates, in a flowchart, one example of a method of introducing a visual notification indication.

FIG. 6 illustrates, in a flowchart, one example of a method 600 of introducing a visual notification indication. The magnification display system may receive a user customization of the visual notification identification (Block 602). The magnification display system may introduce the visual notification indication to the magnification area alerting a user to the event notification 310 (Block 604). The magnification display system may indicate with the visual notification indication a location of the event notification (Block 606). The magnification display system may place the visual notification indication to indicate a notification direction for the event notification in relation to the magnification area (Block 608). The magnification display system may alter a tertiary characteristic of the visual notification indication, such as size or intensity, to indicate a notification distance of the event notification in relation to the magnification area (Block 610). The magnification display system may alter a secondary characteristic of the visual notification indication, such as shape or fill, to indicate an interaction type for the notification event (Block 612). The magnification display system may adjust a color of the visual notification indication to contrast with the magnification area (Block 614). The magnification display system may insert a map inset describing the location of the event notification into the magnification area (Block 616). The magnification display system may adjust a position of the map inset describing a location of the notification event to avoid obscuring a relevant element in the magnification area (Block 618). The magnification display system may receive a user input dismissing the event notification (Block 620).

Figure 7:
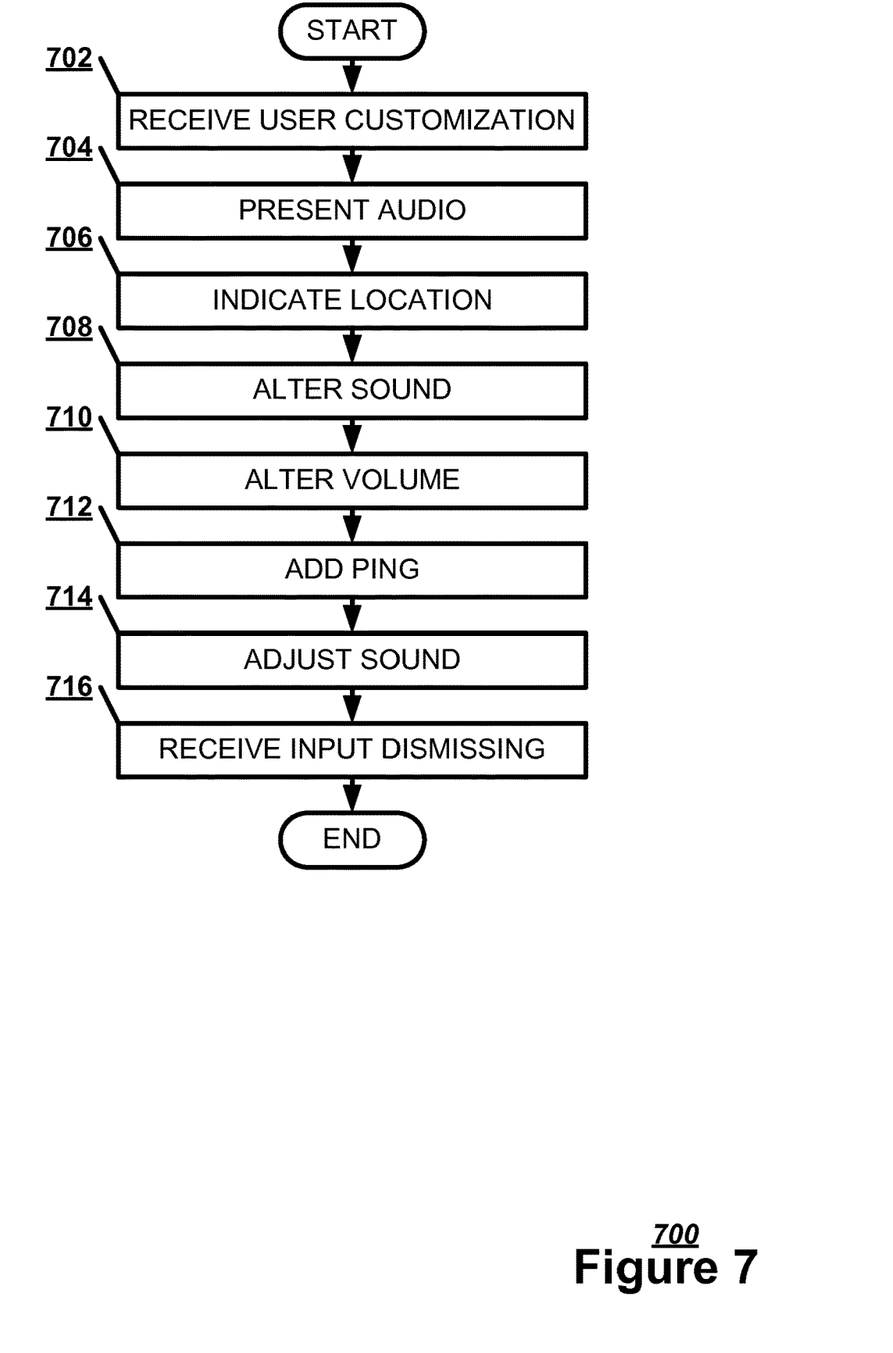
FIG. 7 illustrates, in a flowchart, one example of a method of introducing an audio notification indication.

FIG. 7 illustrates, in a flowchart, one example of a method 700 of introducing an audio notification indication. The magnification display system may receive a user customization of the audio notification identification (Block 702). The magnification display system may present the audio notification indication to a user to alert the user to the event notification (Block 704). The magnification display system may indicate with the audio notification indication a location of the event notification (Block 706). The magnification display system may alter the sound of the audio notification indication to indicate a notification direction for the event notification in relation to the magnification area 262 (Block 708). For example, the audio notification indication may be a simulated dog bark for the lower right corner or a simulated typewriter noise for the upper left corner. The magnification display system may alter a volume of the audio notification indication to indicate a notification distance of the event notification in relation to the magnification area (Block 710). For example, the audio notification indication may get louder as the magnification area approaches the event notification. The magnification display system may add a ping to the end of the audio notification indication to indicate an interaction type for the notification event 310 (Block 712). The magnification display system may adjust the sound of the audio notification indication to contrast with the ambient sound from the user interface (Block 714). The magnification display system may receive a user input dismissing the event notification (Block 716).

Figure 8:
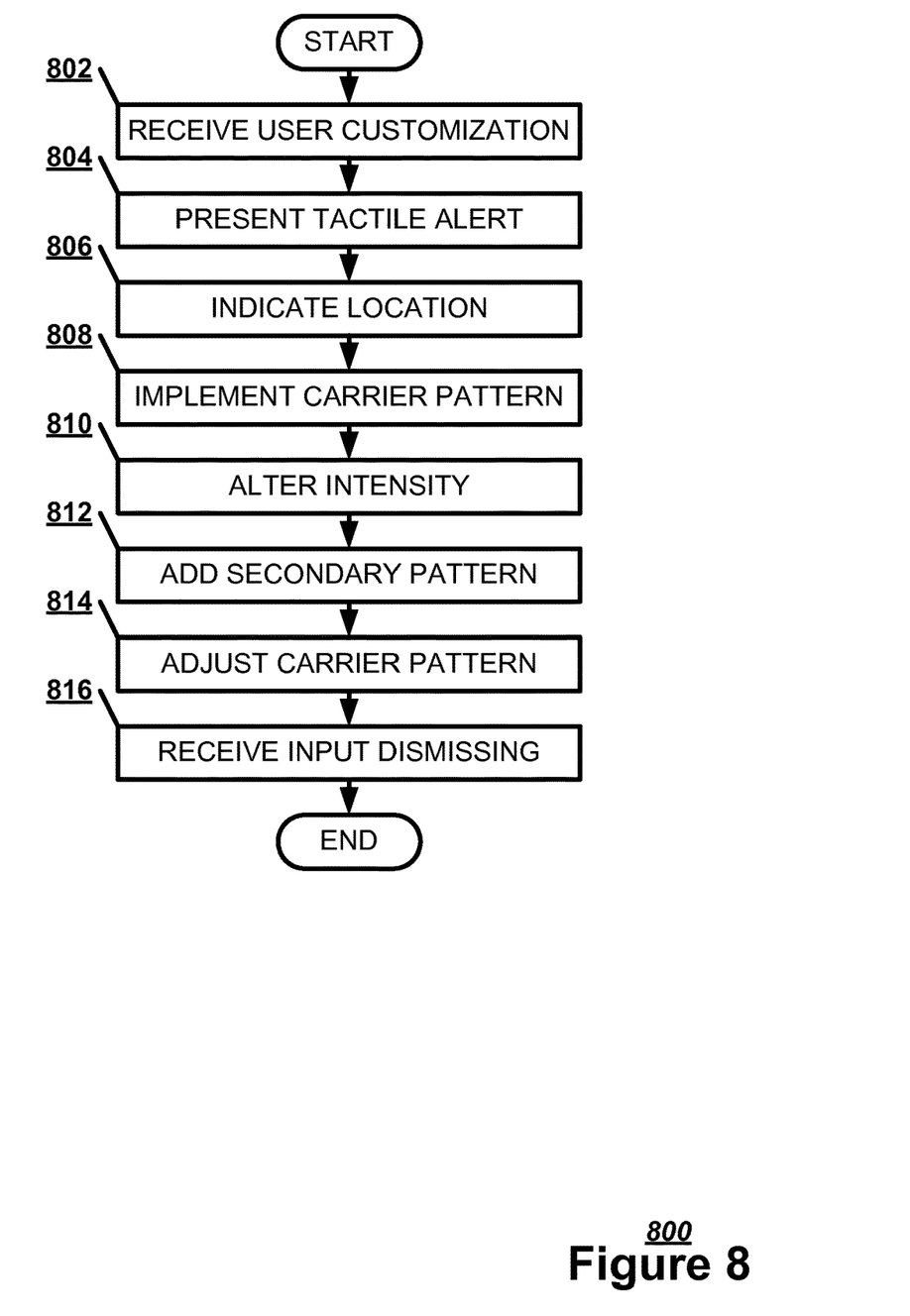
FIG. 8 illustrates, in a flowchart, one example of a method of introducing a tactile notification indication.

FIG. 8 illustrates, in a flowchart, one example of a method 800 of introducing a tactile notification indication. The magnification display system may receive a user customization of the tactile notification identification (Block 802). The magnification display system may present the tactile notification indication to a user to alert the user to the event notification (Block 804). The magnification display system may indicate with the tactile notification indication a location of the event notification (Block 806). The magnification display system may implement a carrier pattern to the tactile notification indication to indicate a notification direction for the event notification in relation to the magnification area (Block 808). For example, the tactile notification indication may have a set number of vibrations in a row indicating a corner number for the viewing area. The magnification display system may alter an intensity of the tactile notification indication to indicate a notification distance of the event notification in relation to the magnification area (Block 810). For example, the tactile notification indication may increase intensity as the magnification area approaches the event notification. The magnification display system may add a secondary pattern to the end of the tactile notification indication to indicate an interaction type for the notification event (Block 812). For example, the tactile notification indication may have a single vibration riding the carrier pattern to indicate an alert event notice and a double vibration riding the carrier pattern to indicate an interactive event notice. The magnification display system may adjust the carrier pattern of the tactile notification indication to contrast with any ambient vibrations from the computing device (Block 814). The magnification display system may receive a user input dismissing the event notification (Block 816).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Examples may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
presenting with a display screen a viewing area representing a portion of a virtual area of a user interface to a user;
applying a magnification area with a magnification module to a section of the viewing area thereby expanding a size of the section to more clearly present the section to the user;
detecting an event notification communicating an incident outside a normal flow of interaction between a user and an application, wherein the event notification is displayed in the viewing area outside the magnification area;
introducing a visual notification indication to the magnification area alerting a user to the event notification;
introducing a non-visual notification indication alerting the user to the event notification, wherein the non-visual notification indication is a tactile indication having a pattern indicating a notification direction for the event notification in relation to the magnification area, and wherein the pattern includes a set number of vibrations in a row indicating a corner of the viewing area; and
moving the magnification area relative to the viewing area and the event notification in response to user input.

2. The method of claim 1, further comprising:
indicating with the visual notification indication a location of the event notification within the viewing area.

3. The method of claim 1, further comprising:
placing the visual notification indication to indicate a notification direction for the event notification relative to the magnification area within the viewing area.

4. The method of claim 1, further comprising:
altering an intensity of the visual notification indication to indicate a notification distance of the event notification from the magnification area.

5. The method of claim 1, further comprising:
altering at least one of a shape or a fill of the visual notification indication to indicate an interactivity with the user for the notification event.

6. The method of claim 1, further comprising:
presenting the viewing area as at least one of an operating system user interface and an application user interface.

7. The method of claim 1, further comprising:
inserting a first simplified icon representing the event notification and a second simplified icon representing the magnification area as a map inset describing a location of the event notification into the magnification area.

8. The method of claim 1, further comprising:
adjusting a position of a map inset describing a location of the notification event to avoid obscuring a relevant element in the magnification area.

9. The method of claim 1, further comprising:
adjusting a color of the visual notification indication to contrast with the magnification area.

10. The method of claim 1, further comprising:
receiving a user input dismissing the event notification.

11. The method of claim 1, further comprising:
receiving a user customization of the visual notification indication.

12. The method of claim 1, further comprising adding a secondary pattern to the end of the tactile notification to indicate an interaction type for the event notification.

13. The method of claim 1 further comprising:
altering the non-visual notification indication based on a distance between the magnification area and the event notification.

14. The method of claim 13, wherein altering the non-visual notification based on the distance comprises increasing an intensity of the tactile indication as the magnification area approaches the event notification.

15. A tangible machine-readable medium having a set of instructions detailing a method stored thereon that when executed by one or more processors cause the one or more processors to perform the method, the method comprising:
presenting with a display screen a viewing area representing a portion of a virtual area of a user interface to a user;
applying a magnification area with a magnification module to a section of the viewing area thereby expanding a size of the section to more clearly present the section to the user;
detecting an event notification communicating an incident outside a normal flow of interaction between a user and an application, wherein the event notification is displayed outside the magnification area;
introducing a notification indication alerting a user to the event notification;
indicating with the notification indication a location of the event notification within the viewing area;
introducing a non-visual notification indication alerting the user to the event notification, wherein the non-visual notification indication is a tactile indication having a pattern indicating a notification direction for the event notification in relation to the magnification area, and wherein the pattern includes a set number of vibrations in a row indicating a corner of the viewing area; and
moving the magnification area relative to the viewing area and the event notification in response to user input.

16. The tangible machine-readable medium of claim 15, wherein the method further comprises:
presenting the notification indication as at least one of a visual notification indication, an audio notification indication, and a tactile notification indication.

17. The tangible machine-readable medium of claim 15, wherein the method further comprises:
altering at least one of a shape or a fill of the notification indication to indicate an interactivity with the user for the notification event.

18. The tangible machine-readable medium of claim 15, wherein the method further comprises:
presenting the viewing area as at least one of an operating system user interface and an application user interface.

19. The tangible machine-readable medium of claim 15, wherein the method further comprises:
adjusting a color of the notification indication to contrast with a context of the magnification area.

20. The tangible machine-readable medium of claim 15, wherein the method further comprises:
receiving a user input dismissing the event notification.

21. The tangible machine-readable medium of claim 15, wherein the method further comprises:
receiving a user customization of the notification indication.

22. A magnification display system, comprising:
a display screen configured to present a viewing area representing a portion of a virtual area of a user interface to a user and to present a magnification area generated by a magnification module for a section of a viewing area thereby expanding a size of the section to more clearly present the section to the user;
a processor configured to:
   detect an event notification communicating an incident outside a normal flow of interaction between the user and an application, wherein the event notification is for display in the viewing area outside the magnification area;
   introduce a visual notification indication within the magnification area that alerts a user to the event notification and indicates a location of the event notification within the viewing area;
   introduce a non-visual notification indication alerting the user to the event notification, wherein the non-visual notification indication is a tactile indication having a pattern indicating a notification direction for the event notification in relation to the magnification area, and wherein the pattern includes a set number of vibrations in a row indicating a corner of the viewing area; and
   move the magnification area relative to the viewing area and the event notification in response to user input.

23. The magnification display system of claim 22, wherein the processor is further configured to insert a first simplified icon representing the event notification and a second simplified icon representing the magnification area as a map inset describing the location of the event notification into the magnification area.

24. The magnification display system of claim 22, wherein the processor is further configured to:
   alter the non-visual notification indication based on a distance between the magnification area and the event notification.

* * * * *